United States Patent
Kim et al.

(10) Patent No.: US 9,843,998 B2
(45) Date of Patent: Dec. 12, 2017

(54) METHOD AND USER EQUIPMENT FOR APPLYING RAN ASSISTANCE INFORMATION FOR EVALUATING AN ANDSF RULE

(71) Applicant: LG ELECTRONICS INC., Seoul (KR)

(72) Inventors: Hyunsook Kim, Seoul (KR); Jinsook Ryu, Seoul (KR); Sunghoon Jung, Seoul (KR); Laeyoung Kim, Seoul (KR); Jaewook Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/912,828

(22) PCT Filed: Mar. 9, 2015

(86) PCT No.: PCT/KR2015/002224
§ 371 (c)(1),
(2) Date: Feb. 18, 2016

(87) PCT Pub. No.: WO2015/137667
PCT Pub. Date: Sep. 17, 2015

(65) Prior Publication Data
US 2016/0198399 A1    Jul. 7, 2016

Related U.S. Application Data

(60) Provisional application No. 61/952,878, filed on Mar. 14, 2014, provisional application No. 61/954,583, (Continued)

(51) Int. Cl.
*H04W 4/00* (2009.01)
*H04W 48/18* (2009.01)
(Continued)

(52) U.S. Cl.
CPC ............ *H04W 48/18* (2013.01); *H04W 40/24* (2013.01); *H04W 48/08* (2013.01); *H04W 88/06* (2013.01)

(58) Field of Classification Search
None
See application file for complete search history.

(56) References Cited

U.S. PATENT DOCUMENTS 8,185,152 B1    5/2012    Goldner
2012/0309447 A1    12/2012    Mustajarvi et al.
(Continued)

FOREIGN PATENT DOCUMENTS

KR    10-2014-0022101 A    2/2014
WO    WO 2014/015734 A1    1/2014

OTHER PUBLICATIONS

Cai et al., "LTE-Advanced Release 12," 3GPP TSG RAN2 Meeting #85, Feb. 10-14, 2014, pp. 1-11.
(Continued)

*Primary Examiner* — Idowu O Osifade
(74) *Attorney, Agent, or Firm* — Birch, Stewart, Kolasch & Birch, LLP

(57) ABSTRACT

A disclosure of the present invention provides a method in which user equipment (UE) selects a network and performs traffic routing. The method may comprise the steps of: receiving first RAN (radio access network) supporting information; receiving second RAN supporting information; and applying the first RAN supporting information or the second RAN supporting information for selecting a network and routing traffic. Here, when the first RAN supporting information has been received by a Home PLMN, if the UE is registered in a visited PLMN, and if the second RAN supporting information is received by the visited PLMN, the second RAN supporting information may be used.

12 Claims, 18 Drawing Sheets

Related U.S. Application Data filed on Mar. 17, 2014, provisional application No. 61/992,226, filed on May 13, 2014.

(51) Int. Cl.
*H04W 40/24* (2009.01)
*H04W 48/08* (2009.01)
*H04W 88/06* (2009.01)

(56) References Cited

U.S. PATENT DOCUMENTS

| | | | |
|---|---|---|---|
| 2013/0012182 A1* | 1/2013 | Liao | H04W 48/20 455/418 |
| 2013/0012260 A1 | 1/2013 | Salkintzis et al. | |
| 2014/0133304 A1* | 5/2014 | Pica | H04W 48/20 370/232 |
| 2015/0003253 A1* | 1/2015 | Wolfner | H04W 28/08 370/237 |
| 2015/0009975 A1* | 1/2015 | Gupta | H04W 48/16 370/338 |
| 2015/0223134 A1 | 8/2015 | Hou et al. | |

OTHER PUBLICATIONS

Qualcomm, "A 3G/LTE Wi-Fi Offload Framework: Connectivity Engine (CnE) to Manage Inter-System Radio Connections and Applications," Jun. 2011, pp. 1-13 (15 pages total).

Zhen et al., "New Technology Prospect of LTE System," Shanghai Research Institute of China Telecom Co., Ltd., Feb. 2013, pp. 8-18, with English abstract.

* cited by examiner

METHOD AND USER EQUIPMENT FOR APPLYING RAN ASSISTANCE INFORMATION FOR EVALUATING AN ANDSF RULE

CROSS REFERENCE TO RELATED APPLICATIONS

This application is the National Phase of PCT International Application No. PCT/KR2015/002224, filed on Mar. 9, 2015, which claims priority under 35 U.S.C. 119(e) to U.S. Provisional Application No. 61/952,878, filed on Mar. 14, 2014, 61/954,583 filed on Mar. 17, 2014 and 61/992,226 filed on May 13, 2014, all of which are hereby expressly incorporated by reference into the present application.

BACKGROUND OF THE INVENTION

Field of the Invention

The present invention relates to a method of performing network selection and traffic routing and a user device.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| REFERENCE POINT | DESCRIPTION |
| --- | --- |
| S1-MME | A reference point for a control plane protocol between the E-UTRAN and the MME |
| S1-U | A reference point between the E-UTRAN and the S-GW for path switching between eNodeBs during handover and user plane tunneling per bearer |
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |

TABLE 1-continued

| REFERENCE POINT | DESCRIPTION |
|---|---|
| S4 | A reference point between the SGW and the SGSN that provides related control and mobility support between the 3GPP anchor functions of a GPRS core and the S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

FIG. 2 is an exemplary diagram showing the architecture of a common E-UTRAN and a common EPC.

As shown in FIG. 2, the eNodeB 20 can perform functions, such as routing to a gateway while RRC connection is activated, the scheduling and transmission of a paging message, the scheduling and transmission of a broadcast channel (BCH), the dynamic allocation of resources to UE in uplink and downlink, a configuration and providing for the measurement of the eNodeB 20, control of a radio bearer, radio admission control, and connection mobility control. The EPC can perform functions, such as the generation of paging, the management of an LTE_IDLE state, the ciphering of a user plane, control of an EPS bearer, the ciphering of NAS signaling, and integrity protection.

FIG. 3 is an exemplary diagram showing the structure of a radio interface protocol in a control plane between UE and an eNodeB, and FIG. 4 is another exemplary diagram showing the structure of a radio interface protocol in a control plane between UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane shown in FIG. 3 and the radio protocol in the user plane of FIG. 4 are described below.

The physical layer PHY, that is, the first layer, provides information transfer service using physical channels. The PHY layer is connected to a Medium Access Control (MAC) layer placed in a higher layer through a transport channel, and data is transferred between the MAC layer and the PHY layer through the transport channel. Furthermore, data is transferred between different PHY layers, that is, PHY layers on the sender side and the receiver side, through the PHY layer.

A physical channel is made up of multiple subframes on a time axis and multiple subcarriers on a frequency axis. Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (TTI), that is, a unit time during which data is transmitted, is 1 ms corresponding to one subframe.

In accordance with 3GPP LTE, physical channels that are present in the physical layer of the sender side and the receiver side can be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

A PCFICH that is transmitted in the first OFDM symbol of a subframe carries a Control Format Indicator (CFI) regarding the number of OFDM symbols (i.e., the size of a control region) used to send control channels within the subframe. A wireless device first receives a CFI on a PCFICH and then monitors PDCCHs.

Unlike a PDCCH, a PCFICH is transmitted through the fixed PCFICH resources of a subframe without using blind decoding.

A PHICH carries positive-acknowledgement (ACK)/negative-acknowledgement (NACK) signals for an uplink (UL) Hybrid Automatic Repeat reQuest (HARQ). ACK/NACK signals for UL data on a PUSCH that is transmitted by a wireless device are transmitted on a PHICH.

A Physical Broadcast Channel (PBCH) is transmitted in four former OFDM symbols of the second slot of the first subframe of a radio frame. The PBCH carries system information that is essential for a wireless device to communicate with an eNodeB, and system information transmitted through a PBCH is called a Master Information Block (MIB). In contrast, system information transmitted on a PDSCH indicated by a PDCCH is called a System Information Block (SIB).

A PDCCH can carry the resource allocation and transport format of a downlink-shared channel (DL-SCH), information about the resource allocation of an uplink shared channel (UL-SCH), paging information for a PCH, system information for a DL-SCH, the resource allocation of an upper layer control message transmitted on a PDSCH, such as a random access response, a set of transmit power control commands for pieces of UE within a specific UE group, and the activation of a Voice over Internet Protocol (VoIP). A plurality of PDCCHs can be transmitted within the control region, and UE can monitor a plurality of PDCCHs. A PDCCH is transmitted on one Control Channel Element (CCE) or an aggregation of multiple contiguous CCEs. A CCE is a logical allocation unit used to provide a PDCCH with a coding rate according to the state of a radio channel. A CCE corresponds to a plurality of resource element groups. The format of a PDCCH and the number of bits of a possible PDCCH are determined by a relationship between the number of CCEs and a coding rate provided by CCEs.

Control information transmitted through a PDCCH is called Downlink Control Information (DCI). DCI can include the resource allocation of a PDSCH (also called a downlink (DL) grant)), the resource allocation of a PUSCH (also called an uplink (UL) grant), a set of transmit power control commands for pieces of UE within a specific UE group, and/or the activation of a Voice over Internet Protocol (VoIP).

Several layers are present in the second layer. First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, a higher layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for sending, by a lower layer, data received from a higher layer in a radio section by segmenting and concatenating the data. Furthermore, in order to guarantee various types of QoS required by radio bearers the RLC layer provides three types of operation modes: a Transparent Mode (TM), an Un-acknowledged Mode (UM), and an Acknowledged Mode (AM). In particular, AM RLC performs a retransmission function through an Automatic Repeat and Request (ARQ) function for reliable data transmission.

The Packet Data Convergence Protocol (PDCP) layer of the second layer performs a header compression function for reducing the size of an IP packet header containing control information that is relatively large in size and unnecessary in order to efficiently send an IP packet, such as IPv4 or IPv6, in a radio section having a small bandwidth when sending the IP packet. Accordingly, transmission efficiency of the radio section can be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs). Here, the RB means service provided by the second layer in order to transfer data between UE and an E-UTRAN.

If an RRC connection is present between the RRC layer of UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of UE has been logically connected to the RRC layer of an E-UTRAN. If the RRC layer of UE is logically connected to the RRC layer of an E-UTRAN, it is called the RRC_CONNECTED state. If the RRC layer of UE is not logically connected to the RRC layer of an E-UTRAN, it is called the RRC_IDLE state. Since UE in the RRC_CONNECTED state has an RRC connection, an E-UTRAN can check the existence of the UE in a cell unit, and thus control the UE effectively. In contrast, if UE is in the RRC_IDLE state, an E-UTRAN cannot check the existence of the UE, and a core network is managed in a Tracking Area (TA) unit, that is, an area unit greater than a cell. That is, only the existence of UE in the RRC_IDLE state is checked in an area unit greater than a cell. In such a case, the UE needs to shift to the RRC_CONNECTED state in order to be provided with common mobile communication service, such as voice or data. Each TA is classified through Tracking Area Identity (TAI). UE can configure TAI through Tracking Area Code (TAC), that is, information broadcasted by a cell.

When a user first turns on the power of UE, the UE first searches for a proper cell, establishes an RRC connection in the corresponding cell, and registers information about the UE with a core network. Thereafter, the UE stays in the RRC_IDLE state. The UE in the RRC_IDLE state (re) selects a cell if necessary and checks system information or paging information. This process is called camp on. When the UE in the RRC_IDLE state needs to establish an RRC connection, the UE establishes an RRC connection with the RRC layer of an E-UTRAN through an RRC connection procedure and shifts to the RRC_CONNECTED state. A case where the UE in the RRC_IDLE state needs to establish with an RRC connection includes multiple cases. The multiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer shown in FIG. 3 is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when UE first accesses a specific Packet Data Network (PDN) or accesses a network. Here, the network allocates an IP address available for UE so that the UE can use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

FIG. 5a is a flowchart illustrating a random access process in 3GPP LTE.

The random access process is used for UE 10 to obtain UL synchronization with a base station, that is, an eNodeB 20, or to be assigned UL radio resources.

The UE 10 receives a root index and a physical random access channel (PRACH) configuration index from the eNodeB 20. 64 candidate random access preambles defined by a Zadoff-Chu (ZC) sequence are present in each cell. The root index is a logical index that is used for the UE to generate the 64 candidate random access preambles.

The transmission of a random access preamble is limited to specific time and frequency resources in each cell. The PRACH configuration index indicates a specific subframe on which a random access preamble can be transmitted and a preamble format.

The UE 10 sends a randomly selected random access preamble to the eNodeB 20. Here, the UE 10 selects one of the 64 candidate random access preambles. Furthermore, the UE selects a subframe corresponding to the PRACH configuration index. The UE 10 sends the selected random access preamble in the selected subframe.

The eNodeB 20 that has received the random access preamble sends a Random Access Response (RAR) to the UE 10. The random access response is detected in two steps. First, the UE 10 detects a PDCCH masked with a random access-RNTI (RA-RNTI). The UE 10 receives a random access response within a Medium Access Control (MAC) Protocol Data Unit (PDU) on a PDSCH that is indicated by the detected PDCCH.

FIG. 5b illustrates a connection process in a radio resource control (RRC) layer.

FIG. 5b shows an RRC state depending on whether there is an RRC connection. The RRC state denotes whether the entity of the RRC layer of UE 10 is in logical connection with the entity of the RRC layer of eNodeB 20, and if yes, it is referred to as RRC connected state, and if no as RRC idle state.

In the connected state, UE 10 has an RRC connection, and thus, the E-UTRAN may grasp the presence of the UE on a cell basis and may thus effectively control UE 10. In contrast, UE 10 in the idle state cannot grasp eNodeB 20 and is managed by a core network on the basis of a tracking area that is larger than a cell. The tracking area is a set of cells. That is, UE 10 in the idle state is grasped for its presence only on a larger area basis, and the UE should switch to the connected state to receive a typical mobile communication service such as voice or data service.

When the user turns on UE 10, UE 10 searches for a proper cell and stays in idle state in the cell. UE 10, when required, establishes an RRC connection with the RRC layer of eNodeB 20 through an RRC connection procedure and transits to the RRC connected state.

There are a number of situations where the UE staying in the idle state needs to establish an RRC connection, for example, when the user attempts to call or when uplink data transmission is needed, or when transmitting a message responsive to reception of a paging message from the EUTRAN.

In order for the idle UE 10 to be RRC connected with eNodeB 20, UE 10 needs to perform the RRC connection procedure as described above. The RRC connection procedure generally comes with the process in which UE 10 transmits an RRC connection request message to eNodeB 20, the process in which eNodeB 20 transmits an RRC connection setup message to UE 10, and the process in which UE 10 transmits an RRC connection setup complete message to eNodeB 20. The processes are described in further detail with reference to FIG. 6.

1) The idle UE 10, when attempting to establish an RRC connection, e.g., for attempting to call or transmit data or responding to paging from eNodeB 20, sends an RRC connection request message to eNodeB 20.

2) When receiving the RRC connection message from UE 10, eNodeB 20 accepts the RRC connection request from UE 10 if there are enough radio resources, and eNodeB 20 sends a response message, RRC connection setup message, to UE 10.

3) When receiving the RRC connection setup message, UE 10 transmits an RRC connection setup complete message to eNodeB 20. If UE 10 successfully transmits the RRC connection setup message, UE 10 happens to establish an RRC connection with eNodeB 20 and switches to the RRC connected state.

Meanwhile, as a movement for offloading the data of a different user terminal onto a common data communication network without passing through the core network of a service provider is attempted, technologies, such as IP Flow Mobility and Seamless Offload (IFOM) and Multi-Access PDN Connectivity (MAPCON) for supporting multi-radio access, have been proposed. The MAPCON technology is for sending data using 3GPP access and Wi-Fi access as respective PDN connections, and the IFOM technology is for sending data by binding 3GPP access and Wi-Fi access to one PDN or P-GW.

FIG. 6a is an exemplary diagram of the MOM technology, and FIG. 7B is an exemplary diagram of the MAPCON technology.

Referring to FIG. 6a, the IFOM technology is to provide the same PDN connection through several pieces of different access. Such IFOM technology provides seamless offloading onto a WLAN.

Furthermore, the IFOM technology provides the transfer of IP flows having the same one PDN connection from one access to the other access.

FIG. 6b is an exemplary diagram of the MAPCON technology.

As can be seen with reference to FIG. 6b, the MAPCON technology is to connect several PDN connections, easily, IP flows to other APNs through another access system.

In accordance with such MAPCON technology, the UE 10 can generate a new PDN connection on access that has not been used before. Alternatively, the UE 10 can generate a new PDN connection in one of several pieces of access that were used before. Alternatively, the UE 10 may transfer some of or all PDN connections to another access.

As described above, with the help of the technologies capable of offloading the traffic of UE onto a WLAN, the congestion of the core network of a mobile communication service provider can be reduced.

The provider provides a policy to the UE in order to divert the traffic onto a general data communication network and the UE may divert data thereof onto the wireless LAN according to the policy.

In order to provision the policy the UE, a 3GPP based access network discovery and selection function (ANDSF) is enhanced to provide a policy associated with the wireless LAN.

FIGS. 7a and 7b show network control entities for selecting an access network.

As can be seen with reference to FIG. 7a, the ANDSF may be present in the home network (Home Public Land Mobile Network (hereinafter called 'HPLMN')) of the UE 10. Furthermore, as can be seen with reference to FIG. 7b, the ANDSF may also be present in the Visited Public Land Mobile Network (hereinafter called 'VPLMN') of the UE 10. When the ANDSF is present in a home network as described above, it may be called an H-ANDSF 61. When the ANDSF is present in a visited network, it may be called a V-ANDSF 62. Hereinafter, the ANDSF 60 generally refers to the H-ANDSF 61 or the V-ANDSF 62.

The ANDSF can provide information about an inter-system movement policy, information for access network search, and information about inter-system routing, for example, a routing rule.

However, assumed is a situation in which the UE 10 roams to the visited network in the home network. In this case, it is assumed that the UE 10 receives policy information from the H-ANDSF in the home network and additionally receives the policy information from the V-ANDSF in the visited network. Under such a situation, it is discussed which policy information the UE 10 is to use.

SUMMARY OF THE INVENTION

Accordingly, an object of the present invention is to present a method that can solve the aforementioned problem.

To achieve the above objects, the present disclosure provides a method for performing network selection and traffic routing. The method may be performed by a user equipment (UE) and comprise: receiving first radio access network (RAN) assistance information; receiving second RAN assistance information in a second PLMN; and using either the first RAN assistance information or the second RAN assistance information for the network selection and the traffic routing. If the first RAN assistance has been received in a first public land mobile network (PLMN), if the second RAN assistance information has been received in the second PLMN, and if the UE is registered in the second PLMN, the second RAN assistance information may be applied in the second PLMN.

The method may further comprise: receiving at least one rule of Access Network Discovery and Selection Function (ANDSF); and evaluating the at least one rule of the ANDSF in usage of either the first RAN assistance information or the second RAN assistance information The first RAN assistance information or the second RAN assistance information may be received from E-UTRAN or UTRAN To achieve the above objects, the present disclosure also provides a method for performing network selection and traffic routing. The method may be performed by a user equipment (UE) and comprise: receiving at least one rule of Access Network Discovery and Selection Function (ANDSF); receiving first radio access network (RAN) assistance information; receiving second RAN assistance information in a second PLMN; and using either the first RAN assistance information or the second RAN assistance information for the network selection and the traffic routing. If the first RAN assistance has been received in a first public land mobile network (PLMN), if the second RAN assistance information has been received in the second PLMN, and if the UE is registered in the second PLMN, the second RAN assistance information may be used in the second PLMN. Here, the second RAN assistance information may be used to evaluate the at least one rule of the ANDSF.

According to the embodiments of the present invention, the problems in the related art can be solved.

BRIEF DESCRIPTION OF THE DRAWINGS

FIG. 15a illustrates an example in which an ISRP is enhanced to include the RAN validity condition for the RAN rule (RAN assistance information) and FIG. 15b is an exemplary diagram illustrating, in detail, the RAN validity condition illustrated in FIG. 15a.

DESCRIPTION OF EXEMPLARY EMBODIMENTS

Figure 1:
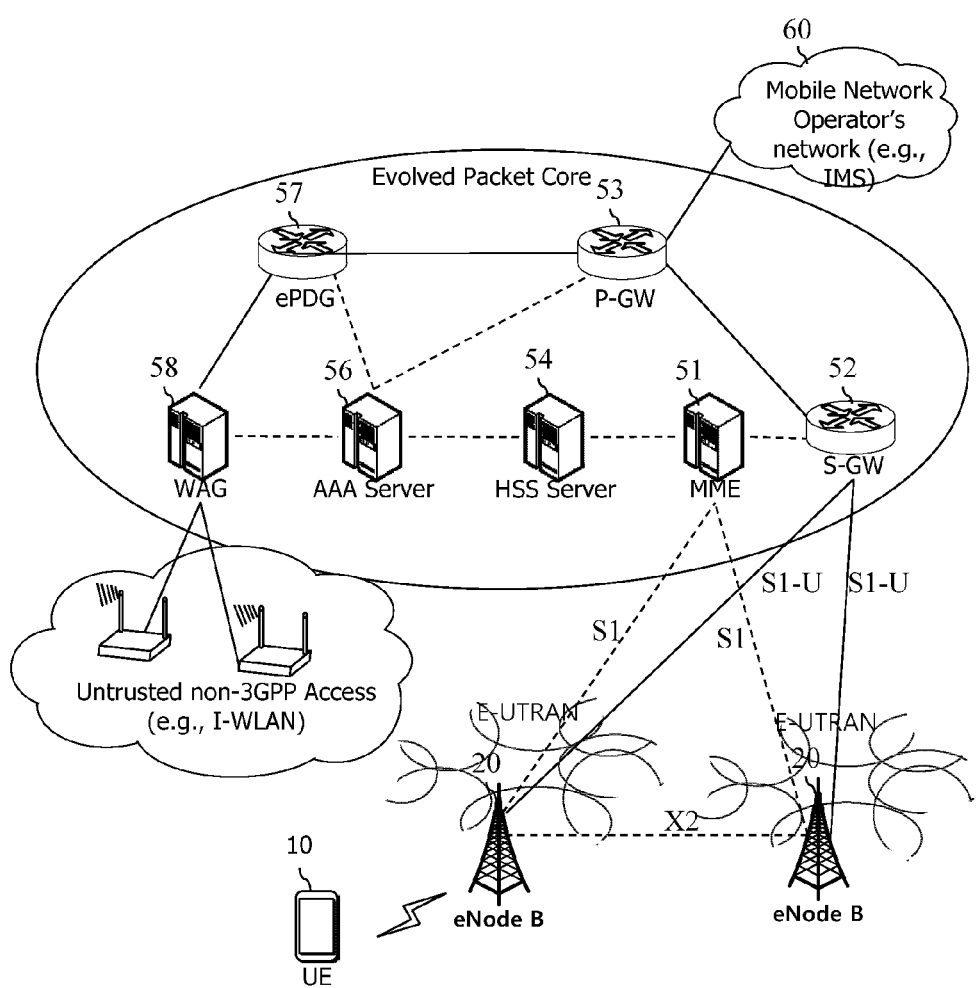
FIG. 1 is a structural diagram of an evolved mobile communication network.
Figure 2:
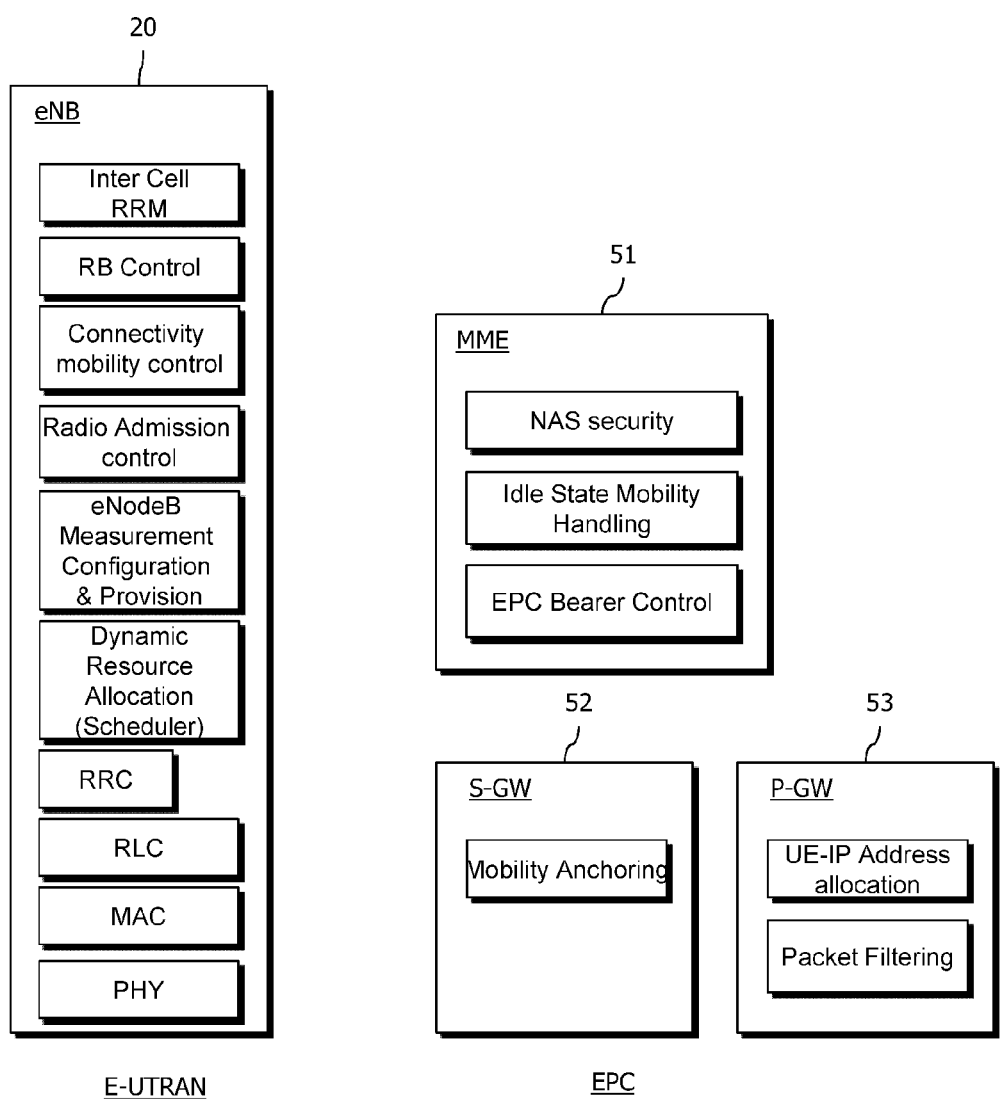
FIG. 2 is an exemplary diagram illustrating architectures of a general E-UTRAN and a general EPC.
Figure 3:
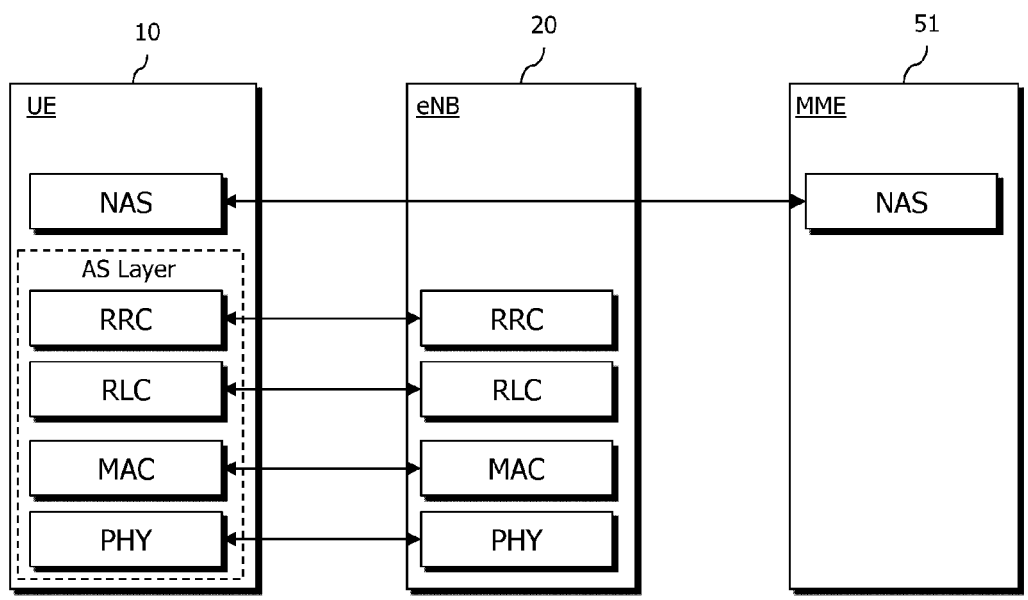
FIG. 3 is an exemplary diagram illustrating a structure of a radio interface protocol on a control plane between UE and eNodeB.
Figure 4:
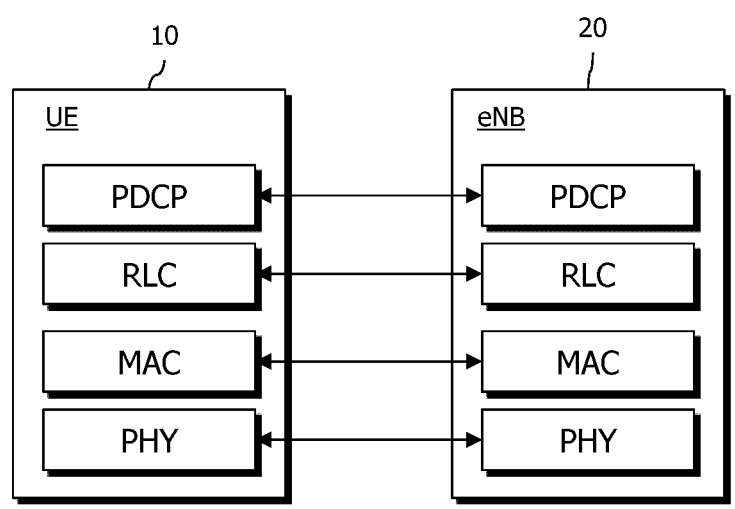
FIG. 4 is another exemplary diagram illustrating a structure of a radio interface protocol on a user plane between the UE and a base station.
Figure 5A:
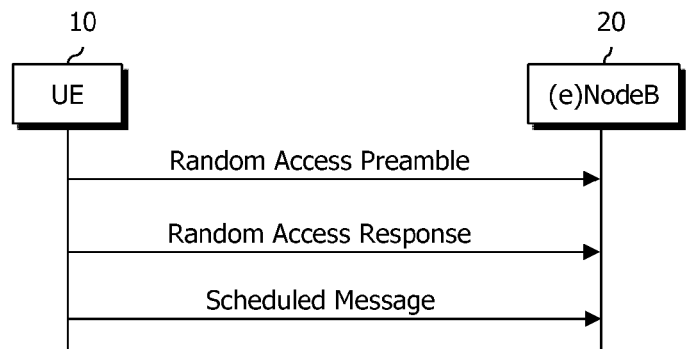
FIG. 5a is a flowchart illustrating a random access process in 3GPP LTE.
Figure 5B:
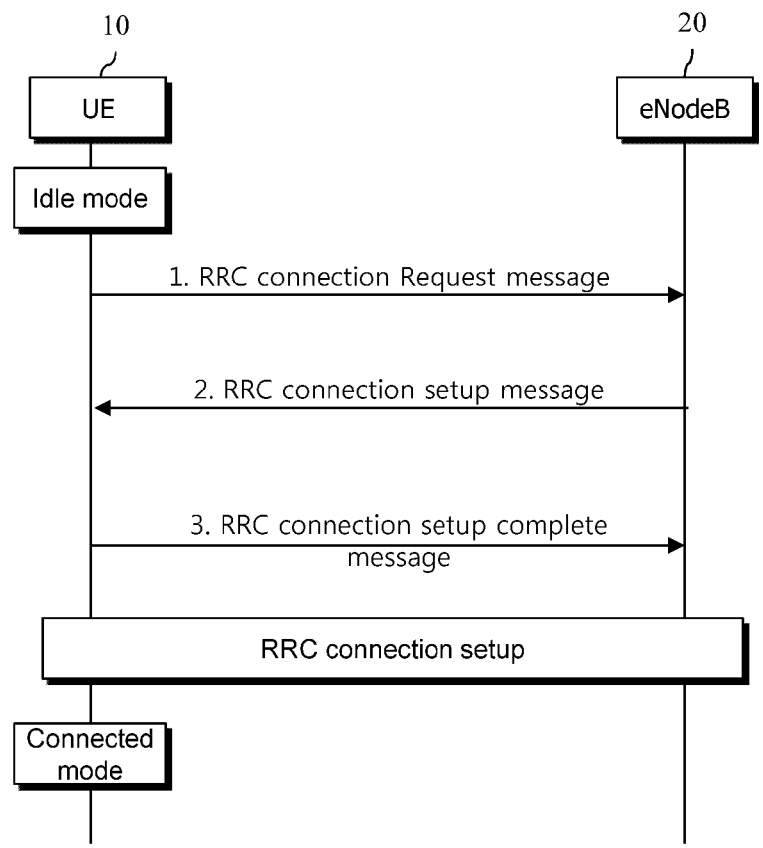
FIG. 5b illustrates a connection process in a radio resource control (RRC) layer.
Figure 6A:
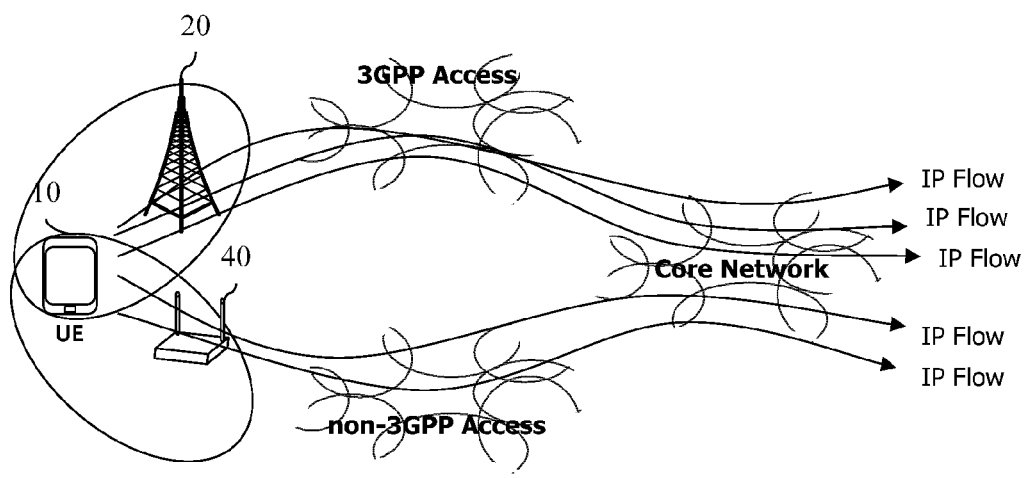
FIG. 6a is an exemplary diagram illustrating an example of an IFOM technique and FIG. 6b is an exemplary diagram illustrating an example of a MAPCON technique.
Figure 6B:
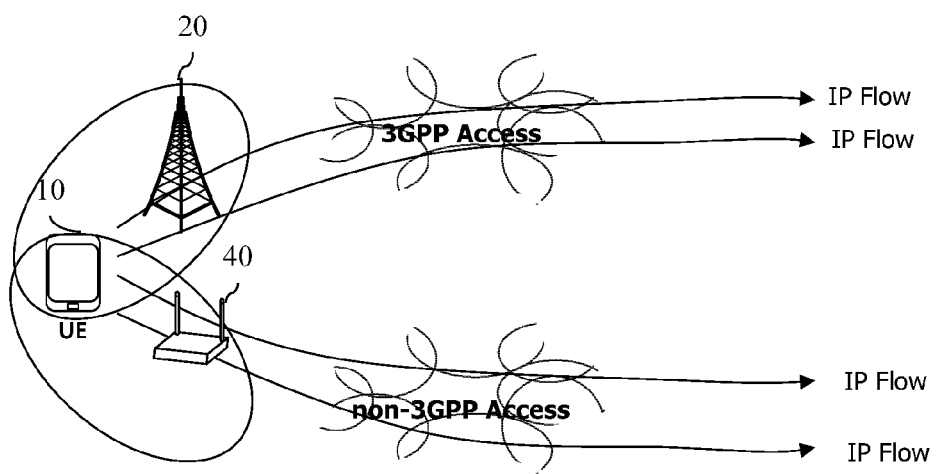
Figure 7A:
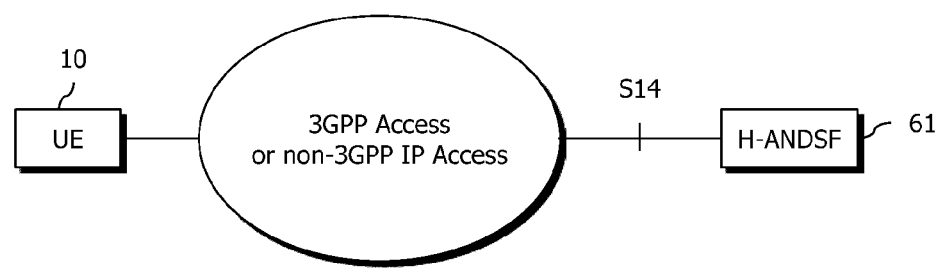
FIGS. 7a and 7b illustrate a network control entity for access network selection.
Figure 7B:
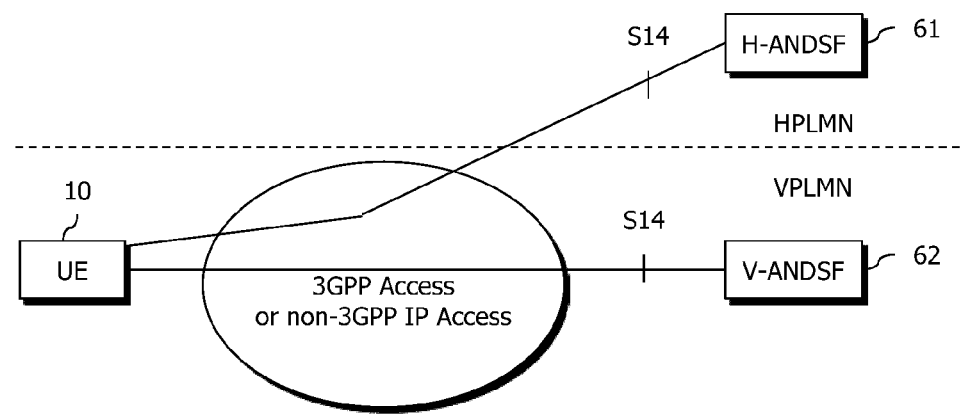

The present invention is described in light of UMTS (Universal Mobile Telecommunication System) and EPC (Evolved Packet Core), but not limited to such communication systems, and may be rather applicable to all communication systems and methods to which the technical spirit of the present invention may apply.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

Definition of Terms

For a better understanding, the terms used herein are briefly defined before going to the detailed description of the invention with reference to the accompanying drawings.

A GERAN is an abbreviation of a GSM EDGE Radio Access Network, and it refers to a radio access section that connects a core network and UE by GSM/EDGE.

A UTRAN is an abbreviation of a Universal Terrestrial Radio Access Network, and it refers to a radio access section that connects the core network of the 3rd generation mobile communication and UE.

An E-UTRAN is an abbreviation of an Evolved Universal Terrestrial Radio Access Network, and it refers to a radio access section that connects the core network of the 4th generation mobile communication, that is, LTE, and UE.

An UMTS is an abbreviation of a Universal Mobile Telecommunication System, and it refers to the core network of the 3rd generation mobile communication.

UE or an MS is an abbreviation of User Equipment or a Mobile Station, and it refers to a terminal device.

An EPS is an abbreviation of an Evolved Packet System, and it refers to a core network supporting a Long Term Evolution (LTE) network and to a network evolved from an UMTS.

A PDN is an abbreviation of a Public Data Network, and it refers to an independent network where a service for providing service is placed.

A PDN connection refers to a connection from UE to a PDN, that is, an association (or connection) between UE represented by an IP address and a PDN represented by an APN.

A PDN-GW is an abbreviation of a Packet Data Network Gateway, and it refers to a network node of an EPS network which performs functions, such as the allocation of a UE IP address, packet screening & filtering, and the collection of charging data.

A Serving gateway (Serving GW) is a network node of an EPS network which performs functions, such as mobility anchor, packet routing, idle mode packet buffering, and triggering an MME to page UE.

A Policy and Charging Rule Function (PCRF) is a node of an EPS network which performs different QoS for each service flow and a policy decision for dynamically applying a charging policy.

An Access Point Name (APN) is the name of an access point that is managed in a network and provides to UE. That is, an APN is a character string that denotes or identifies a PDN. Requested service or a network (PDN) is accessed via a P-GW. An APN is a name (character string, e.g., 'internet.mnc012.mcc345.gprs') previously defined within a network so that the P-GW can be searched for.

A Tunnel Endpoint Identifier (TEID) is an end point ID of a tunnel set up between nodes within a network and is set in each section as a bearer unit of each terminal.

A NodeB is an eNodeB of a UMTS network and installed outdoors. The cell coverage of the NodeB corresponds to a macro cell.

An eNodeB is an eNodeB of an Evolved Packet System (EPS) and is installed outdoors. The cell coverage of the eNodeB corresponds to a macro cell.

An (e)NodeB is a term that denotes a NodeB and an eNodeB.

An MME is an abbreviation of a Mobility Management Entity, and it functions to control each entity within an EPS in order to provide a session and mobility for UE.

A session is a passage for data transmission, and a unit thereof may be a PDN, a bearer, or an IP flow unit. The units may be classified into a unit of the entire target network (i.e., an APN or PDN unit) as defined in 3GPP, a unit (i.e., a bearer unit) classified based on QoS within the entire target network, and a destination IP address unit.

A PDN connection is a connection from UE to a PDN, that is, an association (or connection) between UE represented by an IP address and a PDN represented by an APN. It means a connection between entities (i.e., UE-PDN GW) within a core network so that a session can be formed.

UE context is information about the situation of UE which is used to manage the UE in a network, that is, situation information including an UE ID, mobility (e.g., a current location), and the attributes of a session (e.g., QoS and priority)

A Non-Access-Stratum (NAS) is a higher stratum of a control plane between UE and an MME. The NAS supports mobility management and session management between UE and a network, IP address maintenance, and so on.

RAT is an abbreviation of Radio Access Technology, and it means a GERAN, a UTRAN, or an E-UTRAN.

ANDSF (Access Network Discovery and Selection Function): As one network entity, a policy is provided to discover and select access which the terminal can use by the unit of the provider Meanwhile, hereinafter, this will be described with reference to the drawings.

Figure 8A:
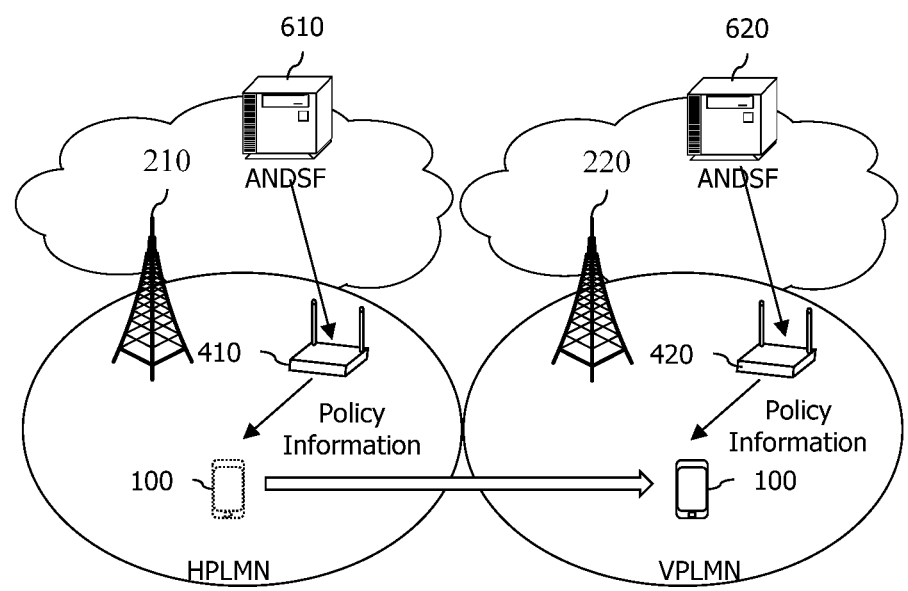
FIGS. 8a and 8b are exemplary diagrams illustrating a problem under a situation in which the UE roams to a visited network from a home network.
Figure 8B:
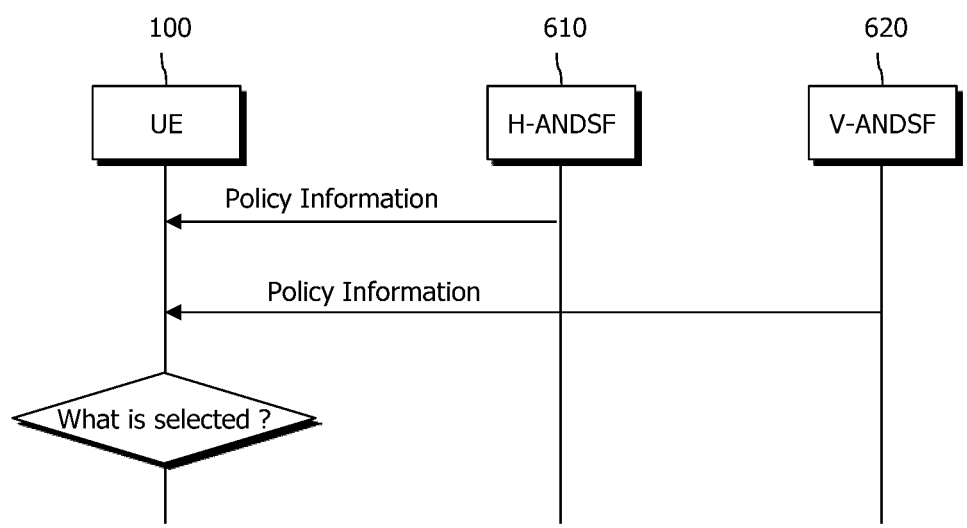

FIGS. 8a and 8b are exemplary diagrams illustrating a problem under a situation in which the UE roams to a visited network from a home network.

As known with reference to FIGS. 8a and 8b, when the UE 100 receives policy information form an H-ANDSF 610 in the home network, e.g., HPLMN and thereafter, roams to the visited network, e.g., VPLMN, the UE 100 additionally receives the policy information from a V-ANDSF 620.

Herein, the policy information may include an Inter-System Mobility Policy (ISMP), an Inter-System Routing Policy (ISRP), an Inter APN Routing Policy (IARP), and a WLAN selection policy (WLANSP).

When the UE 100 has the policy information from two networks PLMN, which policy information the UE 100 is to preferentially use is technically unclear.

Figure 9:
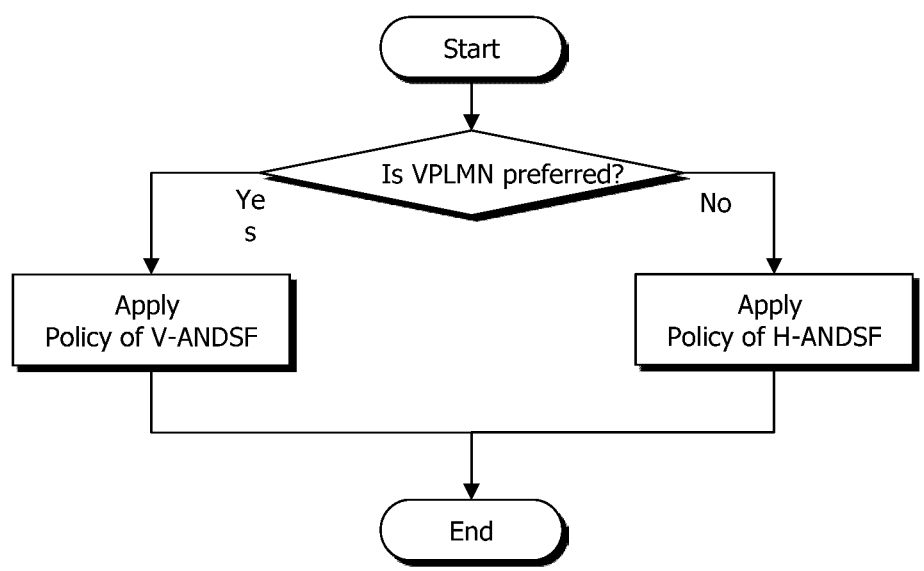
FIG. 9 is an exemplary diagram illustrating a method for solving the problem illustrated in 8a and 8b.

FIG. 9 is an exemplary diagram illustrating a method for solving the problem illustrated in 8a and 8b.

Referring to FIG. 9, first, the UE determines whether the policy provided by the VPLMN is preferred to one provided by the HPLMN. When the policy provided by VPLMN is preferred, the policy information from the V-ANDSF is applied for the WLAN selection and traffic routing.

When the policy provided by the VPLMN is not preferred, it is determined whether the policy information from the H-ANDSF is applicable for the WLAN selection and traffic routing.

However, when the policy provided by the VPLMN is preferred, but the policy information from the V-ANDSF is not applicable, the UE may apply the policy information from the H-ANDSF.

Figure 10A:
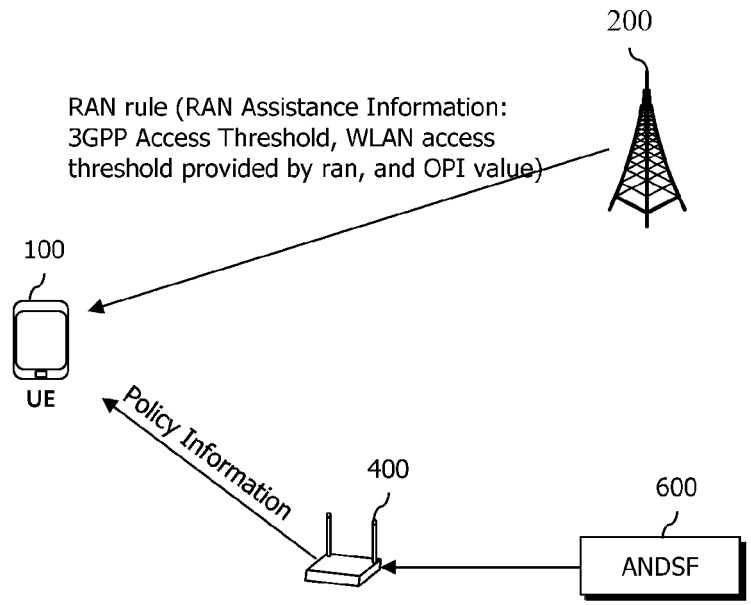
FIG. 10a illustrates an example in which newly defined RAN rule information is provided to the UE except for an ANDSF policy.

FIG. 10a illustrates an example in which newly defined RAN rule (RAN assistance information) is provided to the UE except for an ANDSF policy.

As illustrated in FIG. 10a, the UE 100 may receive the policy information from the ANDSF 600, but the UE 100 may also receive radio access network (RAN) assistance information from a base station 200 of the E-UTRAN (alternatively, UTRAN).

The RAN assistance information may include the following thresholds and parameter.
  3GPP access threshold
  WLAN access threshold
  Offload Preference Indication (OPI) value The 3GG access threshold defines some UTRA and/or E-UTRA radio parameters, for example, a low/high RSRP threshold for the E-UTRA and a low/high CPICH Ec/No threshold for the UTRA. The WLAN access threshold defines low/high thresholds for some WLAN access parameters, for example, a low/high beacon RSSI threshold, a low/high UL/DL backhaul data rate threshold, and a low/high channel utilization threshold. The UL/DL backhaul data rate is defined in hotspot 2.0. The channel utilization and the beacon RSSI are defined in IEEE 802.11.

The OPI value provided by the RAN as a bitmap format (that is, a primary bit array) allows the UE to determine when to move specific traffic (for example, a specific IP flow) to WLAN access or 3GPP access.

The threshold and parameter provided to the UE in the UTRAN or E-UTRAN cell influence validity for the ANDSF rule and is a rule for a condition set by the RAN in the given cell.

User preferences for WLAN network selection and traffic routing may be prior to the ANDSF rule and the RAN rule.

The 3GPP access threshold, the IP value, and some WLAN access values included in the RAN assistance information may be used by the following ANDSF rule.
  ISRP rule, that is, ISRP rule for IFOM, ISRP rule for MAPCON, and ISRP for NSWO
  IARP rule, that is, IARP rule for APN and IARP rule for NSWO The ANDSF rule may use the low/high beacon RSSI threshold, the low/high WLAN channel utilization, and the low/high UL/DL WLAN backhaul data rate threshold included in the RAN assistance information. The thresholds may also be called "RAN provided WLAN access threshold".

Figure 10B:
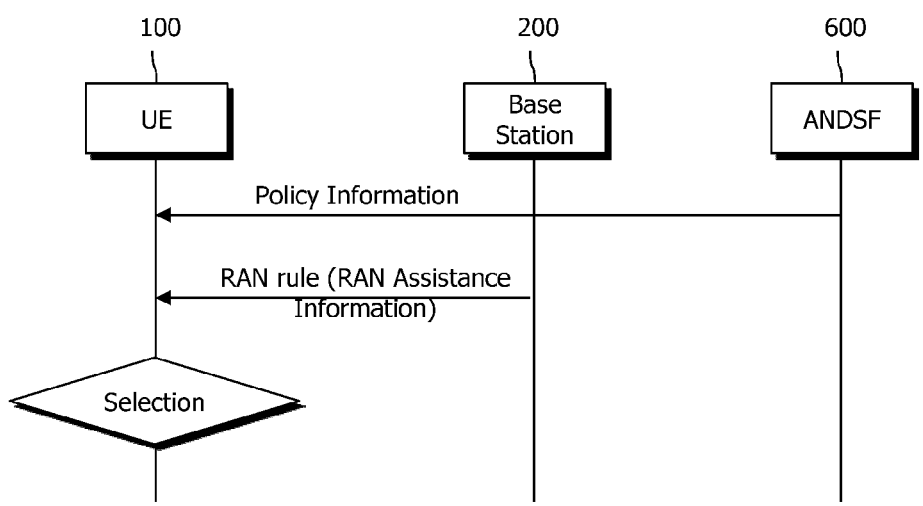
FIG. 10b illustrates a problem when both policy information from an ANDSF and a RAN rule (RAN assistance information) are provided to the UE.

FIG. 10b illustrates a problem when both policy information from an ANDSF and a RAN rule (RAN assistance information) are provided to the UE.

As known with reference to FIG. 10b, when the UE 100 has both the policy information from the ANDSF and the RAN rule, which one of the policy information from the ANDSF and the RAN rule the UE 100 is to be preferentially used is technically unclear.

In other words, there is a problem when the RAN rule and the ANDSF policy are simultaneously provided to the UE.

Furthermore, the problem is further aggravated when the UE roams to the visited network, e.g., VPLMN from the home network, e.g., HPLMN. For example, a policy provided from the H-ANDSF in the home network, e.g., HPLMN, a policy provided from the H-ANDSF in the visited network, e.g., VPLMN, and a RAN rule provided from the base station in the visited network, e.g., VPLMN are present and there is a problem that the UE may not know which policy to preferentially use.

EMBODIMENTS OF INVENTION

According to an embodiment of the present invention, it is assumed that the UE is configured to apply the RAN rule and the RAN parameter and further, apply the ANDSF policy.

Hereinafter, a case in which the UE does not roam to the visited network but stays in the home network and a case in which the UE roams to the visited network will be separately described.

(A) First, a situation in which the UE does not roam to the visited network will be described.

The UE determines a roaming state or not.

In addition, the UE determines which one of the ANDSF policy and the RAN rule is currently provided in the PLMN and applies the policy or rule currently provided in the PLMN.

When the policies currently provided in the PLMN are multiple, any one policy is applied based on a flag indicating which policy of the RAN rule or the ANDSF policy is preferred.

The flag may be additionally included in the ANDSF policy, the RAN rule, or the RAN parameter according to the embodiment of the present invention.

(B) Next, a situation in which the UE roams to the visited network will be described.

The embodiment of the present invention proposes extending information configured in the existing UE, for example, "(not) prefer WLAN selection rules provided by the HPLMN" in order to solve the problem under the situation in which the UE roams to the visited network. That is, by extending an assumption that the policy provided in the VANDSF is preferred to the policy provided in the H-ANDSF when the information configured in the existing UE indicates that the policy provided in the VPLMN is preferred, it may be further assumed that all VPLMN policies are preferred when the RAN rule provided in the VPLMN is included in addition to the VANDSF policy, and as a result, Alternatively, a dedicated signal indicating that the RAN rule is preferred in addition to the VANDSF policy in the VPLMN may be provided or a dedicated signal indicating that only the RAN rule of the VPLMN is preferred may be provided to the UE.

An operation of the UE will be provided below.

The UE determines the roaming state or not.

In addition, the UE determines which one of the ANDSF policy and the RAN rule is currently provided in the PLMN.

Subsequently, the US verifies a configuration regarding a preference for the VPLMN. When the policy of the VPLMN is preferred, the UE applies the policy provided in the VPLMN.

However, when the policies currently provided in the PLMN are multiple, any one policy is selectively applied based on a flag indicating which policy of the RAN rule or the ANDSF policy is applied.

On the contrary, when the policy of the VPLMN is not preferred, the UE applies the policy provided in the HPLMN.

When the policy provided in the HPLMN is just the RAN rule, the UE determines that there is no policy to be applied because the RAN rule is meaningless in the VPLMN.

Figure 11:
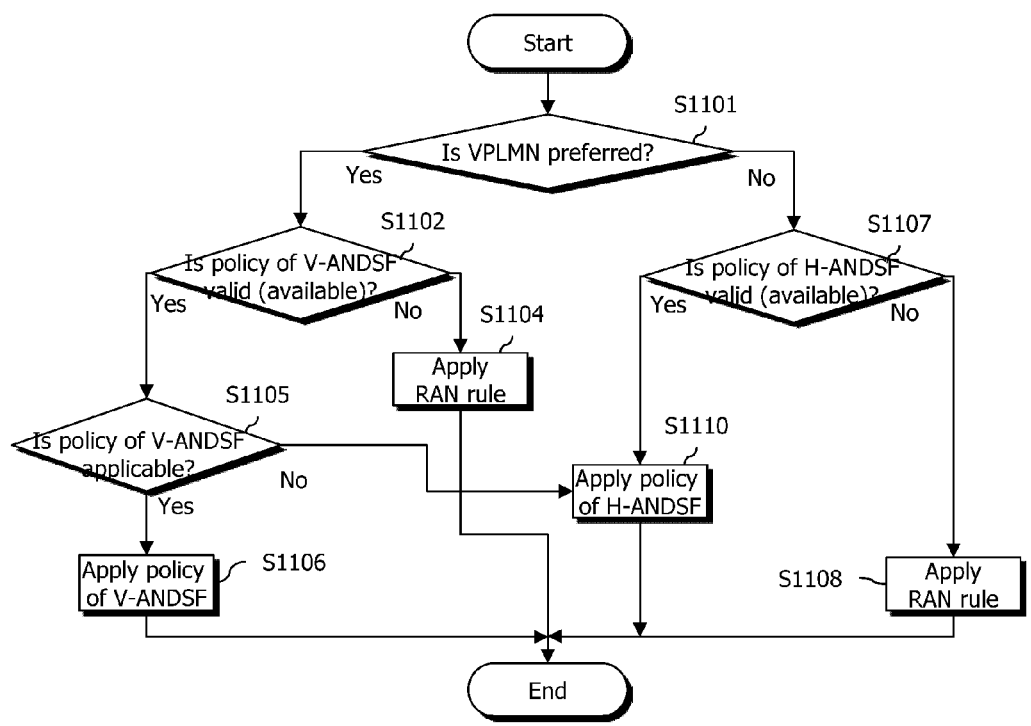
FIG. 11 illustrates a first method for solving the problem in 10a and 10b.

FIG. 11 illustrates a first method for solving the problem in 10a and 10b.

Referring to FIG. 11, the UE determines whether the ANDSF policy or RAN rule in the VPLMN is preferred to the ANDSF policy or RAN rule in the HPLMN (S1101).

When the VPLMN is preferred (S1101), the UE determines whether the policy information of the V-ANDSF is available (S1102). When the policy information of the V-ANDSF in the VPLMN is not available (S1102) and only the RAN rule is available in the VPLMN, the UE applies the corresponding RAN rule (S1104).

When the VPLMN is preferred (S1101) and only the policy information of the V-ANDSF is available (S1102), the UE determines whether the policy information of the V-ANDSF is applicable (S1105). When the policy information of the V-ANDSF is applicable (S1105), the UE applies the policy information of the V-ANDSF (S1106). However, when the policy information of the V-ANDSF is not applicable (S1105), the UE applies the policy information of the H-ANDSF received in the HPLMN (S1110).

When the VPLMN is preferred (S1101) and both the policy information of the V-ANDSF and the RAN rule are available, the UE selects any one according to the flag.

Meanwhile, when the VPLMN is not preferred (S1101), the UE determines whether the policy information from the H-ANDSF is available (S1107). When the policy information of the H-ANDSF in the HPLMN is not available (S1107) and only the RAN rule is available in the VPLMN, the UE applies the corresponding RAN rule (S1108).

When the VPLMN is not preferred (S1101) and only the policy information of the H-ANDSF is available (S1107), the UE applies the policy information of the H-ANDSF received in the HPLMN (S1110).

When the VPLMN is not preferred (S1101) and both the policy information of the H-ANDSF and the RAN rule are available, the UE selects any one according to the flag.

Figure 12:
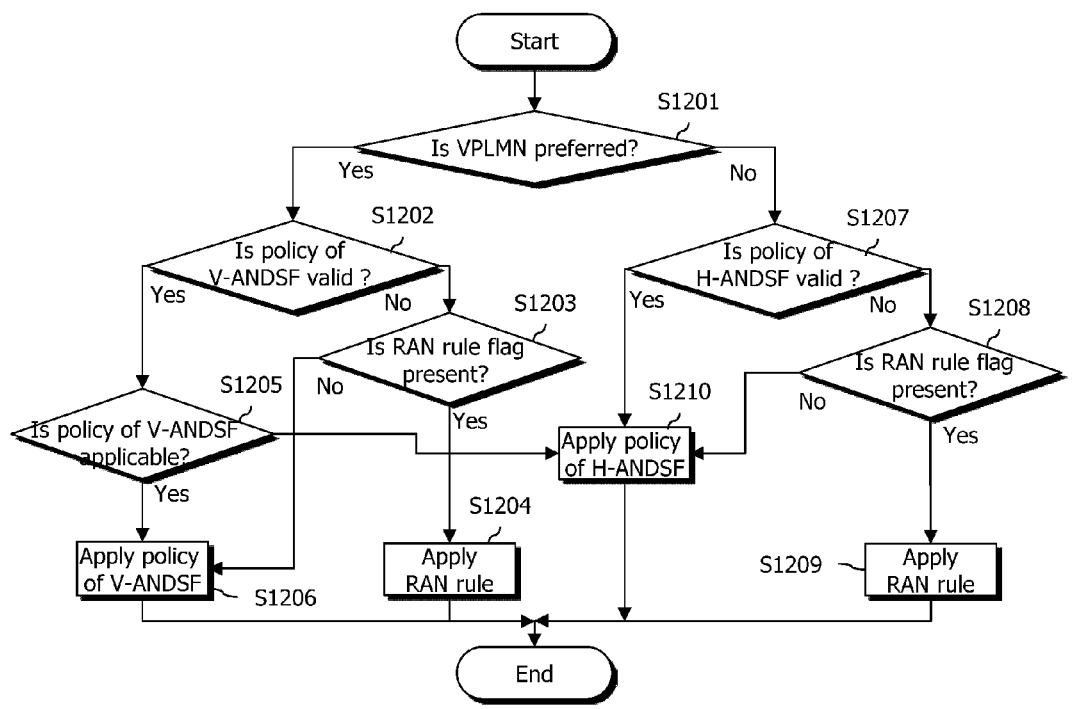
FIG. 12 illustrates a second method for solving the problem in 10a and 10b.

FIG. 12 illustrates a second method for solving the problem in 10a and 10b.

Referring to FIG. 12, an operation according to the RAN rule applyion flag is further added in addition to the policies illustrated in FIG. 11. A detailed description thereof will be provided below.

The UE determines whether the ANDSF policy or RAN rule in the VPLMN is preferred to the ANDSF policy or RAN rule in the HPLMN (S1201).

When the VPLMN is preferred (S1201), the UE determines whether the policy information from the V-ANDSF is valid (S1202). When the policy information of the V-ANDSF in the VPLMN is not valid (S1202), the UE determines whether a flag for applying the RAN rule is set (S1203).

When the flag is set, the UE applies the corresponding RAN rule (S1204). On the contrary, when the flag is not set, the UE applies the policy information of the V-ANDSF (S1206).

On the contrary, when the VPLMN is preferred (S2101), but the policy information of the V-ANDSF is valid (S1202), the UE determines whether the policy information of the V-ANDSF is applicable (S1205). When the policy information of the V-ANDSF is applicable (S1205), the UE applies the policy information of the V-ANDSF is available (S1206). However, when the policy information of the V-ANDSF is not applicable (S1205), the UE applies the policy information of the H-ANDSF received in the HPLMN (S1210).

Meanwhile, when the VPLMN is not preferred (S1201), the UE determines whether the policy information of the H-ANDSF is valid (S1207). When the policy information of the V-ANDSF in the HPLMN is not valid (S1207), the UE determines whether the flag for applying the RAN rule is set (S1208).

When the flag is set, the UE applies the corresponding RAN rule (S1209). On the contrary, when the flag is not set, the UE applies the policy information of the V-ANDSF (S1210).

The description up to now may be summarized as follows.

Only the ANDSF policy, only the RAN rule, or both the ANDSF policy and the RAN rule may be provided in the PLMN (for example, HPLMN or VPLMN).

The UE may receive both the RAN rule and the ANDSF policy and apply the RAN rule and the ANDSF policy for the network selection and traffic routing.

1. The UE may use only any one of the ANDSF policy and the RAN rule, but not use both the ANDSF policy and the RAN rule. That is, the UE may use either only the RAN rule for the network selection and traffic routing or only the ANDSF policy for the network selection and traffic routing. When the ANDSF policy is provided to the UE, the ANDSF policy may be preferred to the RAN rule.

2. With respect to a priority between the policy in the HPLMN and the policy in the VPLMN, the UE may be configured to use a similar method as selecting an active ANDSF rule. That is, the UE may prefer or not prefer the network selection and traffic routing rule provided in the HPLMN. "The UE does not prefer the network selection and traffic routing rule provided in the HPLMN" may be extended to "All policies of the VPLMN are respected for the network selection and traffic routing". That is, the RAN rule in the VPLMN and the ANDSF rule in the VPLMN may be preferred to the ANDSF rule in the HPLMN.

According to an embodiment of the present invention, in the case where the UE is not in the roaming situation, when the ANDSF policy is provided to the UE, the UE applies the ANDSF policy.

In this case, when the UE receives the RAN assistance information from the base station or an RNC in the VPLMN, the UE may take the RAN assistance information into account when evaluating the ANDSF policy and update an ANDSF management object (MO) provisioned by the VPLMN with the RAN assistance information.

However, when the ANDSF policy is not provided to the UE, but the RAN assistance information is provided to the UE, the UE may apply the RAN assistance information.

Next, a case in which the UE is in the roaming situation will be described.

Figure 13:
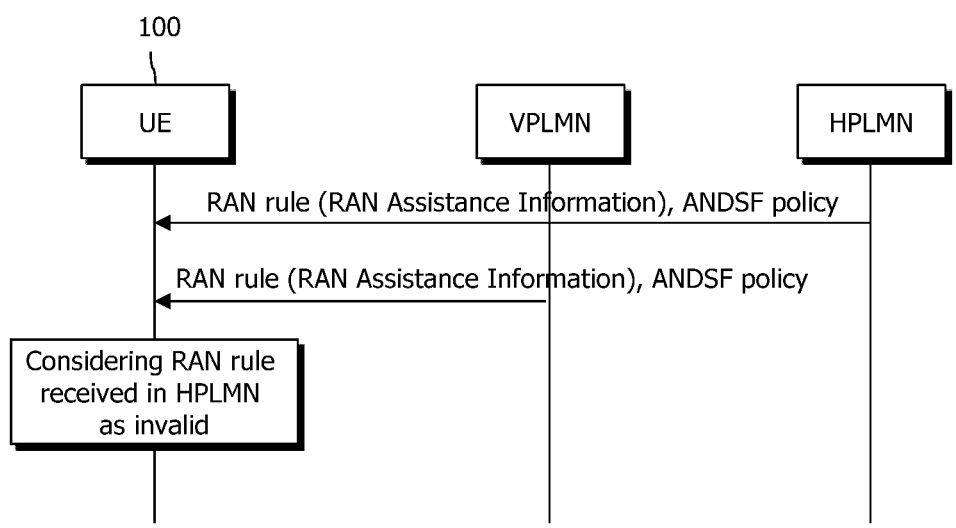
FIG. 13 illustrates an example of a roaming situation of the UE.

FIG. 13 illustrates an example of a roaming situation of the UE.

Referring to FIG. 13, when the UE receives the ANDSF policy and the RAN rule (RAN assistance information) in the home network, e.g., HPLMN and thereafter, roams to the visited network, e.g., VPLMN, an example is illustrated, in which the UE additionally receives the ANDSF policy and the RAN rule (RAN assistance information) in the visited network, e.g., VPLMN.

First, it is herein noted that the RAN rule provided in the HPLMN may not be applied in the VPLMN.

Next, when the UE is configured to "prefer the network selection and traffic routing rule provided by the HPLMN for the network selection and traffic routing" and the ANDSF policy in the HPLMN is provided to the UE, the UE applies the ANDSF policy in the HPLMN. However, when the ANDSF policy in the HPLMN is not provided to the UE, it is regarded that there is no rule available by the UE for the network selection and traffic routing.

When the UE is configured to "not prefer the network selection and traffic routing rule provided by the HPLMN for the network selection and traffic routing" and the ANDSF policy in the VPLMN is provided to the UE, the UE applies the ANDSF policy in the VPLMN.

When the UE receives the RAN assistance information from the base station or the RNC in the visited network, e.g., VPLMN, the RAN assistance information may be considered at the time of evaluating the ANDSF policy. In addition, the ANDSF management object (MO) may be updated based on the RAN assistance information.

Meanwhile, when the ANDSF policy in the VPLMN is not provided to the UE and the UE receives the RAN assistance information from the base station or the RNC in the visited network, e.g., VPLMN, the UE may apply the RAN rule in the VPLMN.

The above description may be summarized as follows.

The ANDSF policy may be applied under a situation in which the UE may use both the 3GPP access and the WLAN access.

When the ANDSF policy is provided to the UE, the UE may use the ANDSF policy for the network selection and traffic routing.

When the UE receives the RAN assistance information from the base station or the RNC, the UE may consider the RAN assistance information at the time of evaluating the ANDSF policy and update the ANDSF MO by using the RAN assistance information.

When the ANDSF policy is not provided to the UE, but the RAN assistance information is provided to the UE, the UE may use the RAN rule.

Meanwhile, when the UE is configured to "prefer the network selection and traffic routing rule provided by the HPLMN for the network selection and traffic routing" and the UE receives the ANDSF policy in the HPLMN, the UE may use the ANDSF policy provided in the HPLMN for the network selection and traffic routing.

However, when the UE is configured to "not prefer the network selection and traffic routing rule provided by the HPLMN for the network selection and traffic routing" and the UE receives the ANDSF policy in the VPLMN, the UE may use the ANDSF policy provided in the VPLMN for the network selection and traffic routing.

In this case, when the UE receives the RAN assistance information from the base station or the RNC in the VPLMN, the UE may consider the RAN assistance information at the time of evaluating the ANDSF policy and update the ANDSF MO provided in the VPLMN by using the RAN assistance information.

Meanwhile, the above description regarding selection of any one of the ANDSF policy and the RAN rule will be summarized below through a table. Table 1 given below shows the situation in which the UE does not roam and Table 2 shows the situation in which the UE roams.

TABLE 2

|  | Only ANDSF policy provided | Only RAN rule policy provided | Both ANDSF policy and RAN rule provided |
|---|---|---|---|
| PLMN providing only ANDSF policy | ANDSF policy | | |
| PLMN providing only RAN rule | | RAN rule | |
| PLMN providing both ANDSF policy and RAN rule | ANDSF policy | ANDSF policy | ANDSF policy |

TABLE 3

| | Policy in VPLMN is preferred | | | Policy in HPLMN is preferred | | |
|---|---|---|---|---|---|---|
| | HPLMN providing only ANDSF policy | HPLMN providing only RAN rule | HPLMN providing both ANDSF policy and RAN rule | HPLMN providing only ANDSF policy | HPLMN providing only RAN rule | HPLMN providing both ANDSF policy and RAN rule |
| VPLMN providing only ANDSF policy | vANDSF policy | vANDSF policy | vANDSF policy | hANDSF policy | N/A | hANDSF policy |
| VPLMN providing only ANDSF policy | vRAN rule | vRAN rule | vRAN rule | hANDSF policy | | hANDSF policy |

Further, the above description is differently expressed as shown in Table 3 below.

TABLE 4

|  | Case# | Preferred and available ANDSF | RAN parameter | Applied | Remarks |
|---|---|---|---|---|---|
| UE does not roam | Case1 | H-ANDSF policy is available | RAN parameter provided | H-ANDSF | ANDSF MO is updated with RAN parameter |
|  | Case2 | H-ANDSF is available | RAN parameter provided | RAN rule |  |
| UE is roaming | Case3 | H-ANDSF is preferred and available | RAN parameter provided | H-ANDSF | ANDSF MO is updated with RAN parameter |
|  | Case4* | H-ANDSF is preferred, but not available | RAN parameter provided | No rule |  |
|  | Case5 | V-ANDSF is preferred and available | RAN parameter provided | V-ANDSF | ANDSF MO is updated with RAN parameter |
|  | Case6 | V-ANDSF is preferred, but not available | RAN parameter provided | RAN rule |  |

On the other hand, the above description may be summarized as follows.

When the UE has the valid ANDSF policy, the UE may use the ANDSF policy for the network selection and traffic routing.

When the UE receives the RAN assistance information from the base station or the RNC in the VPLMN, the UE may take the RAN assistance information into account when evaluating the ANDSF policy provisioned in the VPLMN and update the ANDSF MO provisioned in the VPLMN with the RAN assistance information.

When the UE does not have the valid ANDSF policy and the RAN rule preference flag is set, the UE may use the RAN rule provided in the corresponding PLMN for the network selection and traffic routing.

When the UE is configured to "prefer the network selection and traffic routing rule provided by the HPLMN for the network selection and traffic routing" and the ANDSF policy provided in the HPLMN is valid, the UE may apply the ANDSF policy provided in the HPLMN for the network selection and traffic routing.

However, when the UE is configured to "not prefer the network selection and traffic routing rule provided by the HPLMN for the network selection and traffic routing" and the ANDSF policy provided in the VPLMN is valid, the UE may apply the ANDSF policy provided in the VPLMN for the network selection and traffic routing.

In this case, when the UE receives the RAN assistance information from the base station or the RNC in the VPLMN, the UE may take the RAN assistance information into account when evaluating the ANDSF policy provisioned by the VPLMN and update the ANDSF MO provisioned by the VPLMN with the RAN assistance information.

Figure 14:
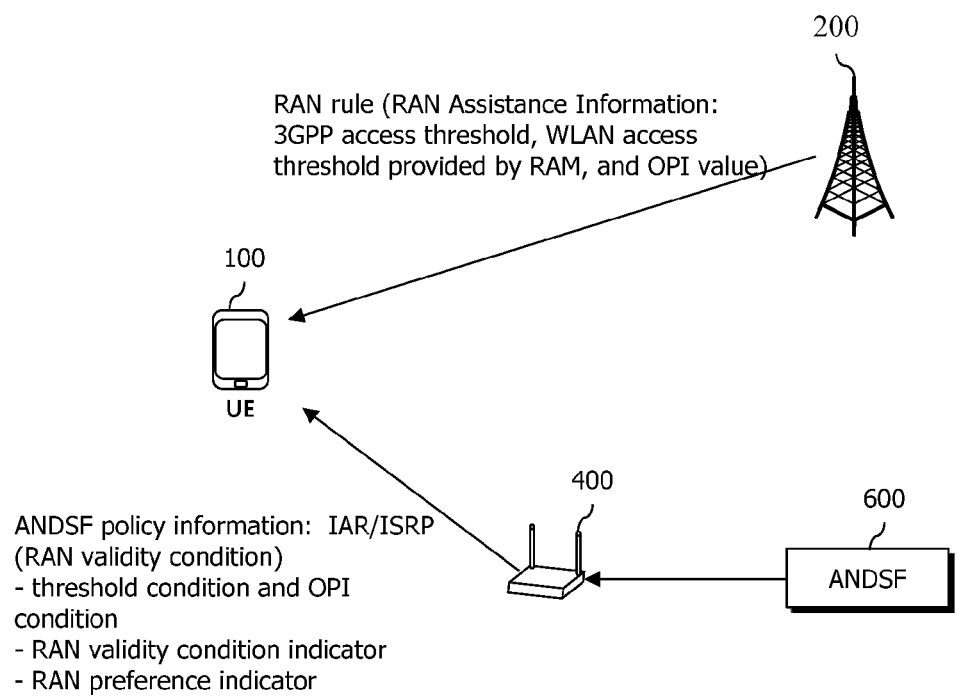
FIG. 14 illustrates an example of receiving an ANDSF policy enhanced to include the RAN rule (RAN assistance information) and a RAN validity condition for the RAN rule (RAN assistance information).

FIG. 14 illustrates an example of receiving an ANDSF policy enhanced to include the RAN rule (RAN assistance information) and a RAN validity condition for the RAN rule (RAN assistance information).

As known with reference to FIG. 13, a RAN rule may include a 3GPP access threshold, a WLAN access threshold provided by the RAN, and an OPI value.

In addition, an IARP or ISRP in ANDSF policy information may be enhanced to include a RAN validity condition. The validity condition may include a threshold condition and an OPI condition, an RAN validity condition indicator, and a RAN preference indicator.

Figure 15A:
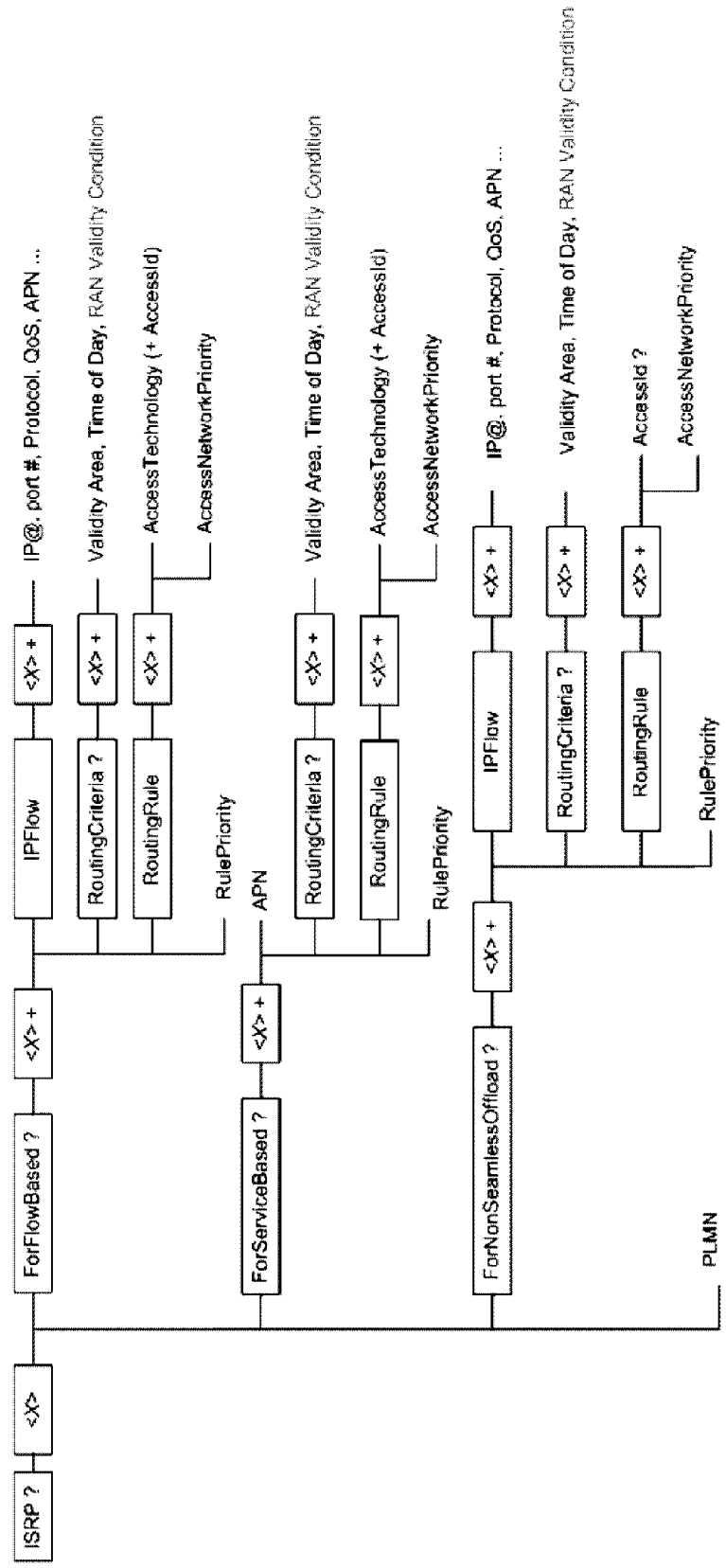
Figure 15B:
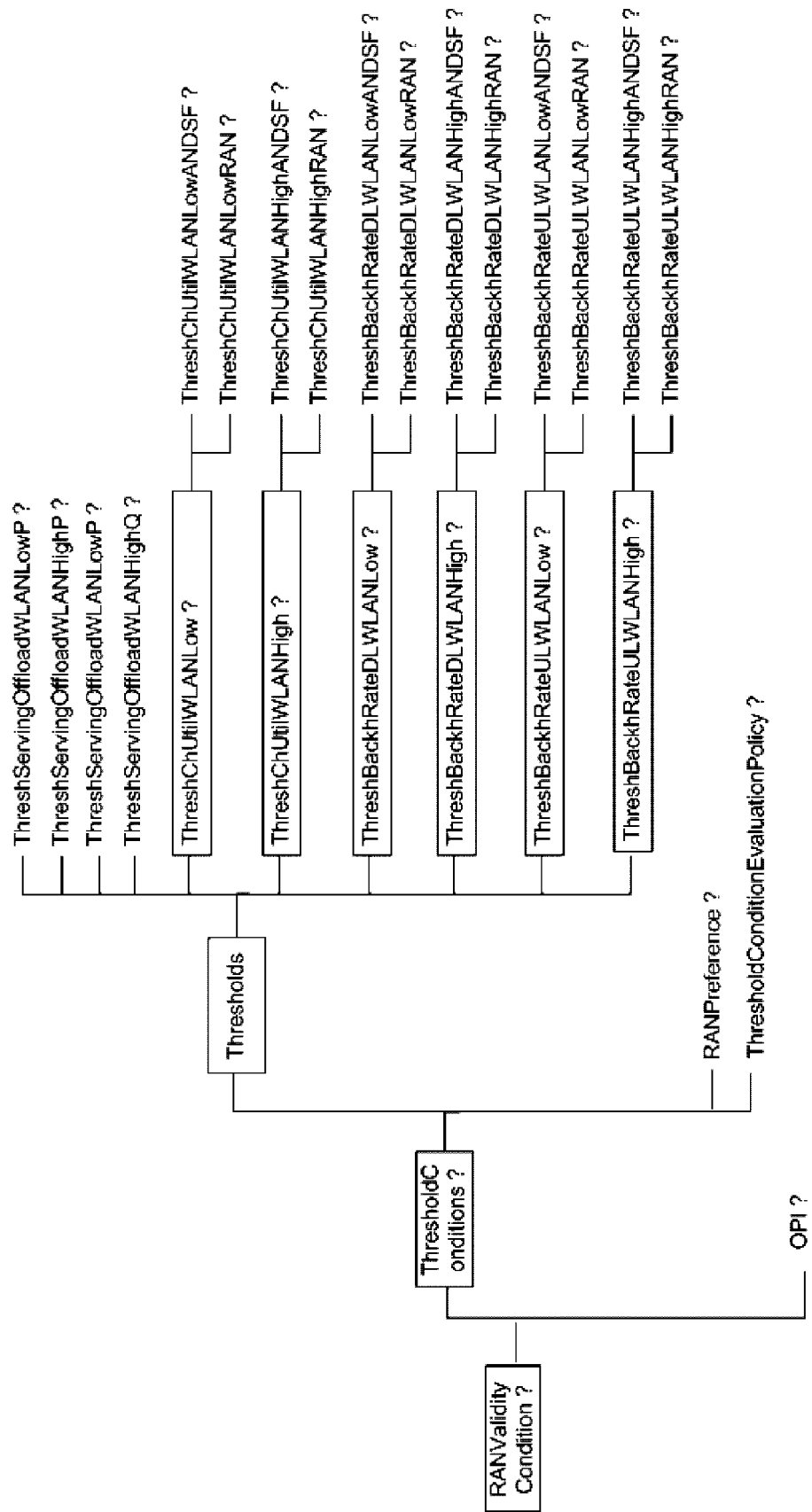

FIG. 15a illustrates an example in which an ISRP is enhanced to include the RAN validity condition for the RAN rule and FIG. 15b is an exemplary diagram illustrating, in detail, the RAN validity condition illustrated in FIG. 15a.

The ISRP rule (alternatively, IARP rule) may use the 3GPP access threshold, the WLAN access threshold provided by the RAN and the OPI value, and the WLAN access threshold provided by the ANDSF which are included in the RAN assistance information. When the rule uses one of the threshold and/or the OPI value, the rule may be configured as follows.

1. As known with reference to FIG. 14a, the IARP/ISRP rule may include the RAN validity condition indicating when the rule is valid or not valid based on the RAN assistance information.

2. As illustrated in FIG. 14b, the RAN validity condition may include one or more threshold conditions and one OPI condition.

3. Each threshold condition is related with (i) the 3GPP access threshold provided by the RAN or (ii) the WLAN access threshold provided by the ANDSF or both thresholds. The threshold condition is evaluated and the evaluation result is true or false.

4. The OPI condition is expressed in a bitmap format determined by the ANDSF. The OPI condition is evaluated by the provided OP and the OPI value provided by the RAN and the evaluation result is true or false.

5. The RAN validity condition includes an indicator indicating whether the rule is valid (a) when all threshold conditions are rule or (b) when any one threshold condition is true.

Figure 16:
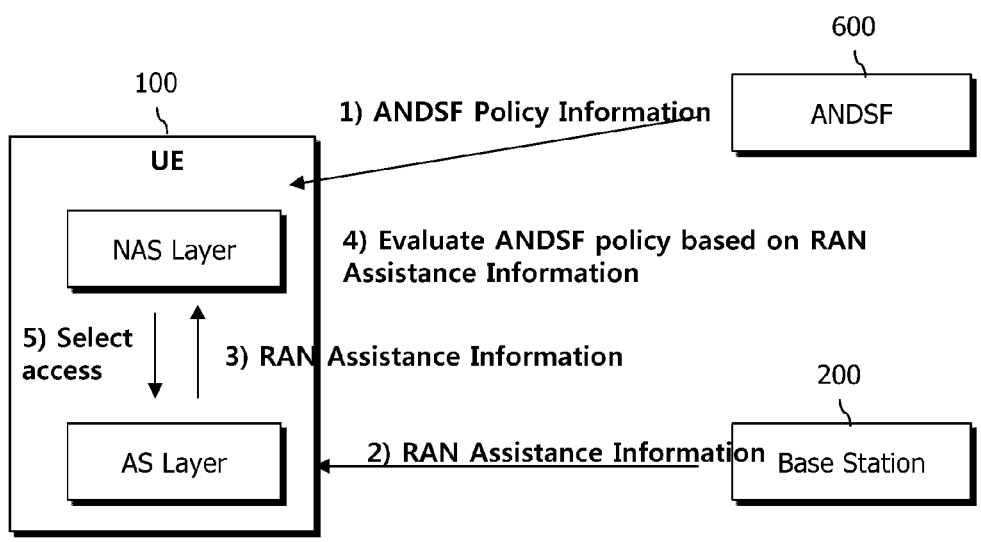
FIG. 16 is an exemplary diagram illustrating an operation of the UE under a situation illustrated in FIG. 14.

FIG. 16 is an exemplary diagram illustrating an operation of the UE under a is situation illustrated in FIG. 14.

As known with reference to FIG. 16, a NAS layer of the UE receives from the ANDSF 600 the ANDSF policy information including the RAN validity condition. In addition, an AS layer of the UE receives the RAN assistance information from the base station 200. Then, the AS layer transfers the RAN assistance information to the NAS layer.

The NAS layer of the UE evaluates the ANDSF policy based on the RAN assistance information. According to the evaluation, the NAS layer instructs the AS layer to select nay one of the 3GPP access and the WLAN access.

The evaluation of the ANDSF policy based on the RAN assistance information will be described below in more detail.

When the UE has the IARP/ISRP including the RAN validity condition, the UE evaluates all threshold conditions and OPI conditions as follows. While the OPI condition is true, when all threshold conditions are true or at least one threshold condition is true, the UE regards that the RAN validity condition is valid.

When any threshold condition is related with the 3GPP access threshold, the UE compares the 3GPP access threshold provided by the RAN and a measurement value to evaluate the threshold condition. For example, in the case where the threshold condition is related with a low RSRP threshold, when a measured RSRP value is smaller than the low RSRP value, the UE may evaluate that the condition is true.

When a predetermined threshold condition is related with the WLAN access threshold provided by the RAN, the UE compares the WLAN access threshold provided by the RAN and a value received from the WLAN to evaluate the threshold condition. For example, in the case where the threshold condition is related with a low channel utilization threshold, when channel utilization of the selected WLAN is smaller than the low channel utilization threshold, the UE may evaluate that the condition is true.

When the predetermined threshold condition is related with the WLAN access threshold provided by the ANDSF, the UE compares the WLAN access threshold provided by the ANDSF and a value received from the selected WLAN to evaluate the threshold condition. For example, in the case where the threshold condition is related with a high DL/UL backhaul data rate threshold, when DL/UL backhaul data utilization of the selected WLAN is larger than the high threshold, the UE may evaluate that the condition is true.

When the predetermined threshold condition is related with both the WLAN access threshold provided by the RAN and the WLAN access threshold by the ANDSF, the UE may evaluate the threshold condition by using the WLAN access threshold provided by the RAN. However, in this case, when the WLAN access threshold provided by the RAN is not available, the WLAN access threshold provided by the ANDSF may be substitutively used.

The UE performs an AND-bit operation between the OPI value provided by the RAN and the OPI value included in the rule to evaluate an OPI condition. When a result of the AND bit operation is not 0, the UE may regard that the OPI condition is true.

Contents described up to now may be implemented by hardware. This will be described with reference to FIG. 17.

Figure 17:
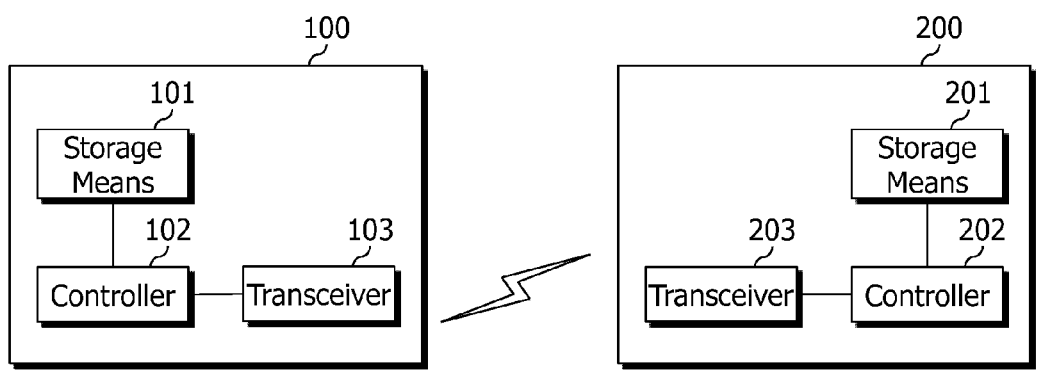
FIG. 17 is a block diagram illustrating UE 100 and a base station 200 according to an embodiment of the present invention.

FIG. 17 is a block diagram illustrating UE 100 and a base station 200 according to an embodiment of the present invention.

As illustrated in FIG. 17, the UE 100 includes a storage means 101, a controller 102, and a transceiver 103. In addition, the base station 200 includes a storage means 201, a controller 202, and a transceiver 203.

The storage mans 101 and 201 stores the aforementioned method.

The controllers 102 and 202 control the storage means 101 and 201 and the transceiver 103 and 203. In detail, the controllers 102 and 202 execute the methods stored in the storage means 101 and 201, respectively. In addition, the controllers 102 and 202 transmit the aforementioned signals through the transceivers 103 and 203.

Although preferred embodiments of the present invention have been exemplarily described hereinabove, since the scope of the present invention is not limited to the specific embodiment, various modifications, changes, or enhancements of the present invention can be made within the spirit of the present invention and the scope disclosed in the appended claims.

What is claimed is:

1. A method for performing network selection and traffic routing, the method performed by a user equipment (UE) and comprising:

receiving an Access Network Discovery and Selection Function (ANDSF) rule including an Inter-System Routing Policy (ISRP) rule or an Inter-Access Point Name (Inter-APN) Routing Policy (IARP) rule;

receiving, from a base station, radio access network (RAN) assistance information, wherein the RAN assistance information received from the base station is used to evaluate the ISRP rule or the IARP rule of the ANDSF rule; and evaluating whether the ISRP rule or the IARP rule of the ANDSF rule is valid or not by using the RAN assistance information, wherein if the ANDSF rule including the ISRP rule or the IARP rule is not valid, the RAN assistance information is utilized for performing network selection and traffic routing.

2. The method of claim 1, wherein the receiving of the RAN assistance information includes:

receiving first RAN assistance information; and receiving second RAN assistance information, wherein the method further includes: using either the first RAN assistance information or the second RAN assistance information for the network selection and the traffic routing, and wherein if the first RAN assistance has been received in a first public land mobile network (PLMN), if the second RAN assistance information has been received in a second PLMN, and if the UE is registered in the second PLMN, the second RAN assistance information is used in the second PLMN.

3. The method of claim 1, wherein the RAN assistance information is received from an evolved universal mobile telecommunications system (UMTS) terrestrial radio access network (E-UTRAN) or a UTRAN.

4. The method of claim 1, wherein the UE is configured to use third generation partnership project (3GPP) access and wireless local area network (WLAN) access.

5. The method of claim 1, wherein the RAN assistance information includes at least one of:

a third generation partnership project (3GPP) access threshold;

a wireless local area network (WLAN) access threshold; and an Offload Preference Indication (OPI) value.

6. The method of claim 1, wherein the receiving of the ANDSF rule includes:

receiving a first ANDSF rule in a first Public Land Mobile Network (PLMN); and receiving a second ANDSF rule in a second PLMN.

7. A user equipment (UE) for performing network selection and traffic routing, the UE comprising:

a transceiver configured to:

receive an Access Network Discovery and Selection Function (ANDSF) rule including an Inter-System Routing Policy (ISRP) rule or an Inter-Access Point Name (Inter-APN) Routing Policy (IARP) rule, and receive, from a base station, radio access network (RAN) assistance information, wherein the RAN assistance information received from the base station is used to evaluate the ISRP rule or the IARP rule of the ANDSF rule; and a processor configured to evaluate whether the ISRP rule or the IARP rule of the ANDSF rule is valid or not by using the RAN assistance information, wherein if the ANDSF rule including the ISRP rule or the IARP rule is not valid, the RAN assistance information is utilized for performing network selection and traffic routing.

8. The UE of claim 7,
wherein if the RAN assistance information includes first RAN assistance information and second RAN assistance information, the processor is further configured to use either the first RAN assistance information or the second RAN assistance information for the network selection and the traffic routing, and
wherein if the first RAN assistance has been received in a first public land mobile network (PLMN), if the second RAN assistance information has been received in a second PLMN, and if the UE is registered in the second PLMN, the second RAN assistance information is used in the second PLMN.

9. The UE of claim 7, wherein the RAN assistance information is received from an evolved universal mobile telecommunications system (UMTS) terrestrial radio access network (E-UTRAN) or a UTRAN.

10. The UE of claim 7, wherein the UE is configured to use third generation partnership project (3GPP) access and wireless local area network (WLAN) access.

11. The UE of claim 7, wherein the RAN assistance information includes at least one of:
a third generation partnership project (3GPP) access threshold;
a wireless local area network (WLAN) access threshold; and
an Offload Preference Indication (OPI) value.

12. The UE of claim 7, wherein the receiving of the ANDSF rule includes:
receiving a first ANDSF rule in a first Public Land Mobile Network (PLMN); and
receiving a second ANDSF rule in a second PLMN.

* * * * *